(12) United States Patent
Pollett

(10) Patent No.: US 9,869,047 B2
(45) Date of Patent: Jan. 16, 2018

(54) UNITARY TOP PANEL FOR A WASHING MACHINE APPLIANCE

(71) Applicant: General Electric Company, Schenectady, NY (US)

(72) Inventor: James Quentin Pollett, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 476 days.

(21) Appl. No.: 14/533,153

(22) Filed: Nov. 5, 2014

(65) Prior Publication Data

US 2016/0122933 A1    May 5, 2016

(51) Int. Cl.
| | |
|---|---|
| *D06F 37/26* | (2006.01) |
| *D06F 23/04* | (2006.01) |
| *D06F 39/08* | (2006.01) |
| *B33Y 80/00* | (2015.01) |
| *B33Y 10/00* | (2015.01) |

(52) U.S. Cl.
CPC ............ *D06F 37/267* (2013.01); *B33Y 10/00* (2014.12); *B33Y 80/00* (2014.12); *D06F 23/04* (2013.01); *D06F 37/26* (2013.01); *D06F 39/088* (2013.01)

(58) Field of Classification Search
CPC ...... D06F 39/088; D06F 37/26; D06F 37/267; D06F 23/04; B33Y 80/00; B33Y 10/00
See application file for complete search history.

(56) References Cited

U.S. PATENT DOCUMENTS

| | | | | |
|---|---|---|---|---|
| 3,121,317 | A * | 2/1964 | Toma | D06F 37/206 68/196 |
| 3,257,830 | A * | 6/1966 | Shelton | D06F 13/00 68/133 |
| 3,312,087 | A * | 4/1967 | Toma | D06F 33/00 68/12.05 |
| 3,312,234 | A * | 4/1967 | Morey | D06F 33/02 137/819 |
| 5,657,650 | A * | 8/1997 | Lee | D06F 39/083 68/207 |
| 5,713,222 | A * | 2/1998 | Johnson | D06F 39/088 239/521 |
| 5,937,677 | A * | 8/1999 | Lee | D06F 39/083 68/13 R |
| 7,312,269 | B2 | 12/2007 | Cevolini | |
| 7,677,062 | B2 * | 3/2010 | Zaccone | D06F 25/00 68/207 |
| 8,286,236 | B2 | 10/2012 | Jung | |
| 8,336,313 | B2 | 12/2012 | McMasters | |
| 2005/0072194 | A1 * | 4/2005 | Ryohke | D06F 19/00 68/3 R |

(Continued)

FOREIGN PATENT DOCUMENTS

CN    103287191 A    9/2013

*Primary Examiner* — Michael Barr
*Assistant Examiner* — Benjamin L Osterhout
(74) *Attorney, Agent, or Firm* — Dority & Manning, P.A.

(57) ABSTRACT

A unitary top panel for a washing machine appliance defines an opening and has a nozzle positioned at the opening. The unitary top panel also defines a conduit within the unitary top panel that extends to the nozzle in order to direct a flow of wash fluid to the nozzle. A related method for forming a unitary top panel for a washing machine appliance is also provided.

18 Claims, 6 Drawing Sheets

(56) References Cited

U.S. PATENT DOCUMENTS

2007/0107471 A1\* 5/2007 Zaccone .............. D06F 25/00
  68/3 R
2010/0000266 A1\* 1/2010 Chung .............. D06F 39/083
  68/205 R \* cited by examiner

UNITARY TOP PANEL FOR A WASHING MACHINE APPLIANCE

FIELD OF THE INVENTION

The present subject matter relates generally to washing machine appliances, such as vertical axis washing machine appliances, and top panels for the same.

BACKGROUND OF THE INVENTION

Washing machine appliances generally include a tub and a basket positioned within the tub. Articles for washing are placed within the basket, and the basket is rotated in the tub in order to clean the articles within the basket. The articles are also generally soaked with wash fluid during a wash cycle in order to assist cleaning the articles. After the wash cycle is complete, the articles may be rinsed in order to remove the wash fluid from the articles.

Thoroughly rinsing the articles can be difficult. For example, nozzles that direct wash fluid into the basket can be difficult to accurately aim such that fluid from the nozzle is directed towards all articles within the basket, and the rinse cycle may take an extended period of time or consume a large amount to water in order to thoroughly rinse the articles. In addition, articles within the basket may stick to a sidewall of the basket after the basket is rotated at high speeds to wring wash fluid from the articles. Removing the articles from the sidewalls of the basket with fluid from the nozzle can be a tedious and long process.

Accordingly, a washing machine appliance with features assisting with thoroughly rinsing articles within a basket of the washing machine appliance would be useful. In addition, a washing machine appliance with features for assisting with removing articles from a sidewall of a basket of the washing machine appliance would be useful.

BRIEF DESCRIPTION OF THE INVENTION

The present subject matter provides a unitary top panel for a washing machine appliance. The unitary top panel defines an opening and has a nozzle positioned at the opening. The unitary top panel also defines a conduit within the unitary top panel that extends to the nozzle in order to direct a flow of wash fluid to the nozzle. A related method for forming a unitary top panel for a washing machine appliance is also provided. Additional aspects and advantages of the invention will be set forth in part in the following description, or may be apparent from the description, or may be learned through practice of the invention.

In a first exemplary embodiment, a vertical axis washing machine appliance is provided. The vertical axis washing machine appliance includes a tub and a basket positioned within the tub. The basket is rotatable about a vertical axis within the tub. A cabinet extends between a top portion and a bottom portion. The tub is disposed within the cabinet. The cabinet has a unitary top panel positioned at the top portion of the cabinet. The unitary top panel defines an opening for accessing the basket within the tub. The unitary top panel also has a nozzle positioned at the opening of the unitary top panel and oriented for directing a flow of wash fluid into at least one of the basket and the tub. The unitary top panel defines a conduit within the unitary top panel that extends to the nozzle in order to direct the flow of wash fluid to the nozzle.

In a second exemplary embodiment, a method for forming a unitary top panel for a washing machine appliance is provided. The method includes establishing three-dimensional information of the unitary top panel, converting the three-dimensional information of the unitary top panel from said step of establishing into a plurality of slices with each slice of the plurality of slices defining a respective cross-sectional layer of the unitary top panel, and successively forming each cross-sectional layer of the unitary top panel with an additive process. After the step of successively forming, the unitary top panel defines an opening at a middle portion of the unitary top panel, the unitary top panel has a nozzle positioned at the opening of the unitary top panel, and the unitary top panel defines a conduit within the unitary top panel that extends to the nozzle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
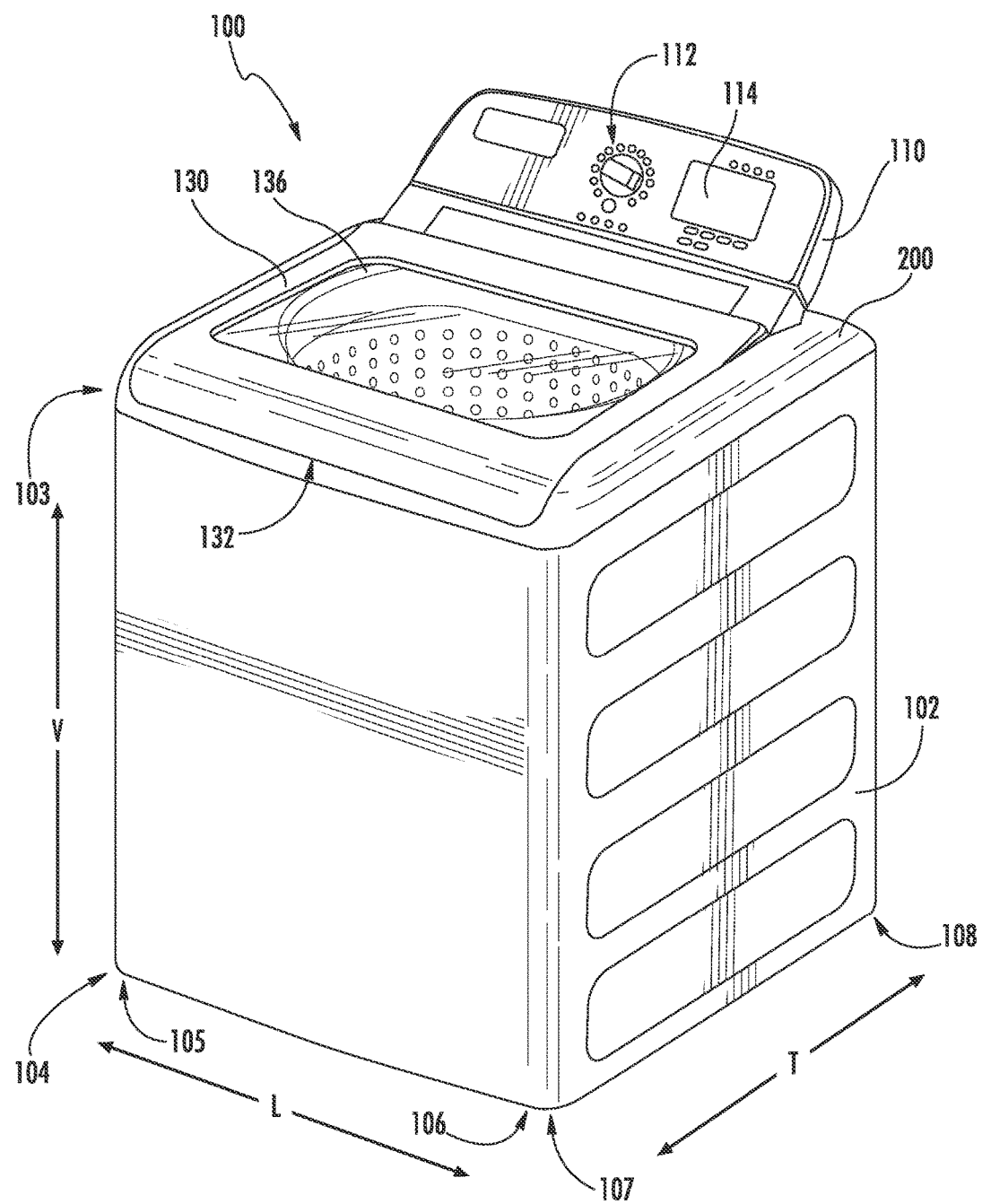
FIG. 1 provides a perspective view of a washing machine appliance according to an exemplary embodiment of the present subject matter with a door of the exemplary washing machine appliance shown in a closed position.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
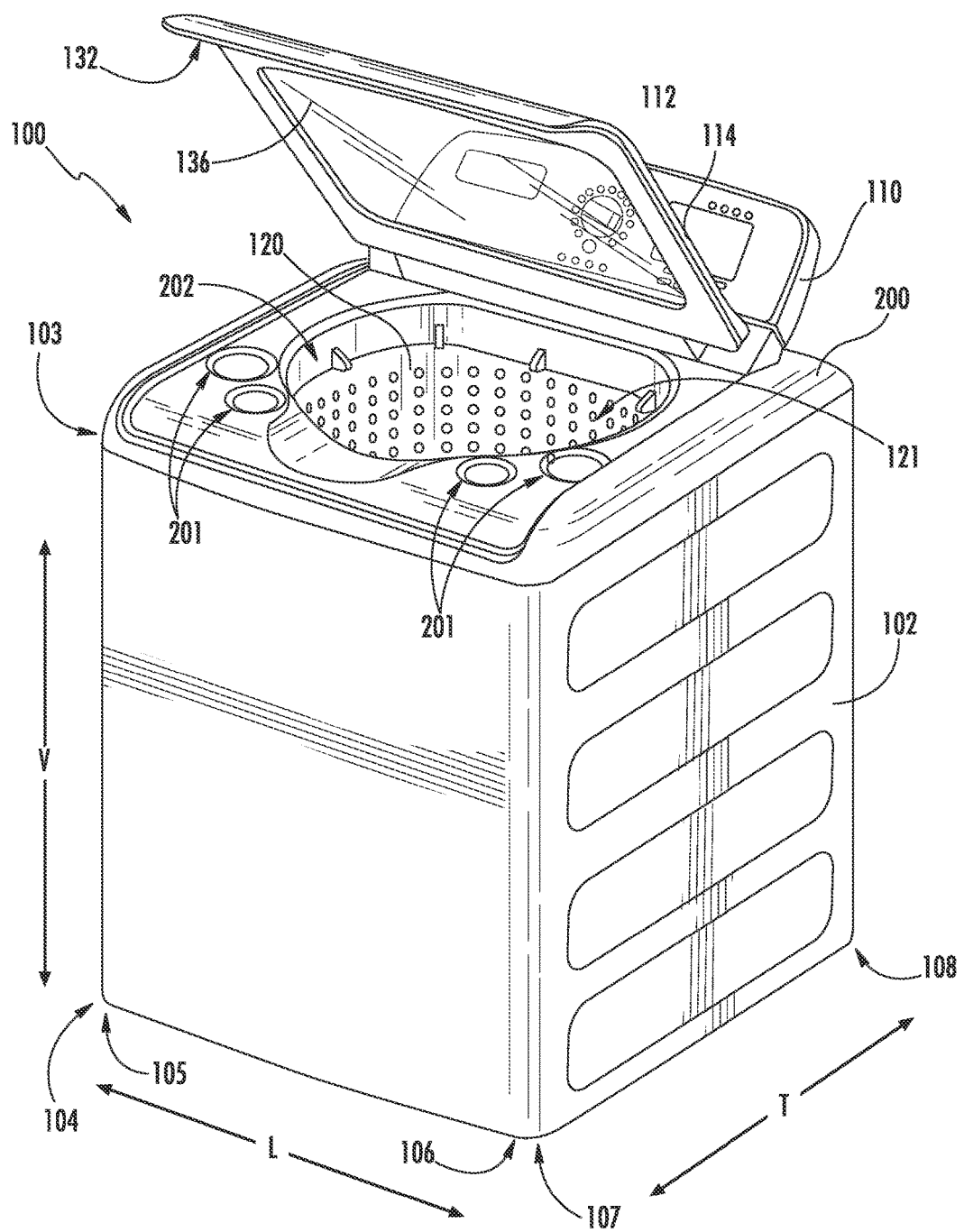
FIG. 2 provides a perspective view of the exemplary washing machine appliance of FIG. 1 with the door shown in an open position.

FIGS. 1 and 2 illustrate an exemplary embodiment of a vertical axis washing machine appliance 100. In FIG. 1, a lid or door 130 is shown in a closed position. In FIG. 2, door 130 is shown in an open position. While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well.

As may be seen in FIGS. 1 and 2, washing machine appliance 100 defines a vertical direction V, a lateral direction L and a transverse direction T. The vertical direction V, lateral direction L and transverse direction T are mutually perpendicular and form an orthogonal direction system. Washing machine appliance 100 has a cabinet 102 that extends between a top portion 103 and a bottom portion 104 along the vertical direction V. Cabinet 102 also extends between a first side portion 105 and a second side portion 106, e.g., along the lateral direction L, and a front portion 107 and a back portion 108, e.g., along the transverse direction T.

A wash basket 120 is rotatably mounted within cabinet 102, e.g., within a wash tub (not shown) disposed within cabinet 102. A motor (not shown) is in mechanical communication with wash basket 120 in order to selectively rotate wash basket 120, e.g., during an agitation or a rinse cycle of washing machine appliance 100. Wash basket 120 defines a wash chamber 121 that is configured for receipt of articles for washing. An agitator or impeller (not shown) extends from wash basket 120 into wash chamber 121. The impeller assists agitation of articles disposed within wash chamber 121 during operation of washing machine appliance 100.

Cabinet 102 of washing machine appliance 100 has a top panel 200 positioned at or adjacent top portion 103 of cabinet 102. Top panel 200 defines an opening 202 that permits user access to wash chamber 121 of wash basket 120. Door 130 is rotatably mounted to top panel 200. However, alternatively, door 130 may be mounted to cabinet 102 or any outer suitable support. Door 130 selectively rotates between the closed position shown in FIG. 1 and the open position shown in FIG. 2. In the closed position, door 130 inhibits access to wash chamber 121. Conversely, in the open position, a user can access wash chamber 121. A window 136 in door 130 permits viewing of wash chamber 121 when door 130 is in the closed position, e.g., during operation of washing machine appliance 100. Door 130 also includes a handle 132 that, e.g., a user may pull and/or lift when opening and closing door 130.

Top panel 200 defines a plurality of holes 201. Plurality of holes 201 are configured for receipt of a plurality of fluid additives, e.g., detergent, fabric softener, and/or bleach. In particular, each one of the plurality of holes 201 is configured for receipt of a particular one of the plurality of fluid additives. Plurality of holes 201 permit the plurality of fluid additives to pass through top panel 200 to a fluid additive reservoir or dispenser (not shown) disposed below top panel 200 along the vertical direction V.

A control panel 110 with a plurality of input selectors 112 extends from top panel 200 at top portion 103 of cabinet 102. Control panel 110 and input selectors 112 collectively form a user interface input for operator selection of machine cycles and features. A display 114 of control panel 110 indicates selected features, a countdown timer, and/or other items of interest to appliance users.

Operation of washing machine appliance 100 is controlled by a controller or processing device (not shown) that is operatively coupled to control panel 110 for user manipulation to select washing machine cycles and features. In response to user manipulation of control panel 110, the controller operates the various components of washing machine appliance 100 to execute selected machine cycles and features.

In an illustrative embodiment, laundry items are loaded into wash chamber 121 through opening 202, and washing operation is initiated through operator manipulation of input selectors 112. Wash basket 120 or the wash tub is filled with water and detergent to form a wash fluid. One or more valves (not shown) can be controlled by washing machine appliance 100 to provide for filling wash basket 120 to the appropriate level for the amount of articles being washed. Once wash basket 120 is properly filled with fluid, the contents of wash chamber 121 are agitated (e.g., with the impeller) for cleansing of laundry items in wash basket 120.

After the agitation phase of the wash cycle is completed, wash basket 120 is drained. Laundry articles can then be rinsed by again adding fluid to wash basket 120, depending on the particulars of the cleaning cycle selected by a user, the impeller may again provide agitation within wash chamber 121. One or more spin cycles may also be used. In particular, a spin cycle may be applied after the wash cycle and/or after the rinse cycle in order to wring wash fluid from the articles being washed. During a spin cycle, wash basket 120 is rotated at relatively high speeds. After articles disposed in wash basket 120 are cleaned and/or washed, the user can remove the articles from wash basket 120, e.g., by reaching into wash chamber 121 through opening 202.

Figure 3:
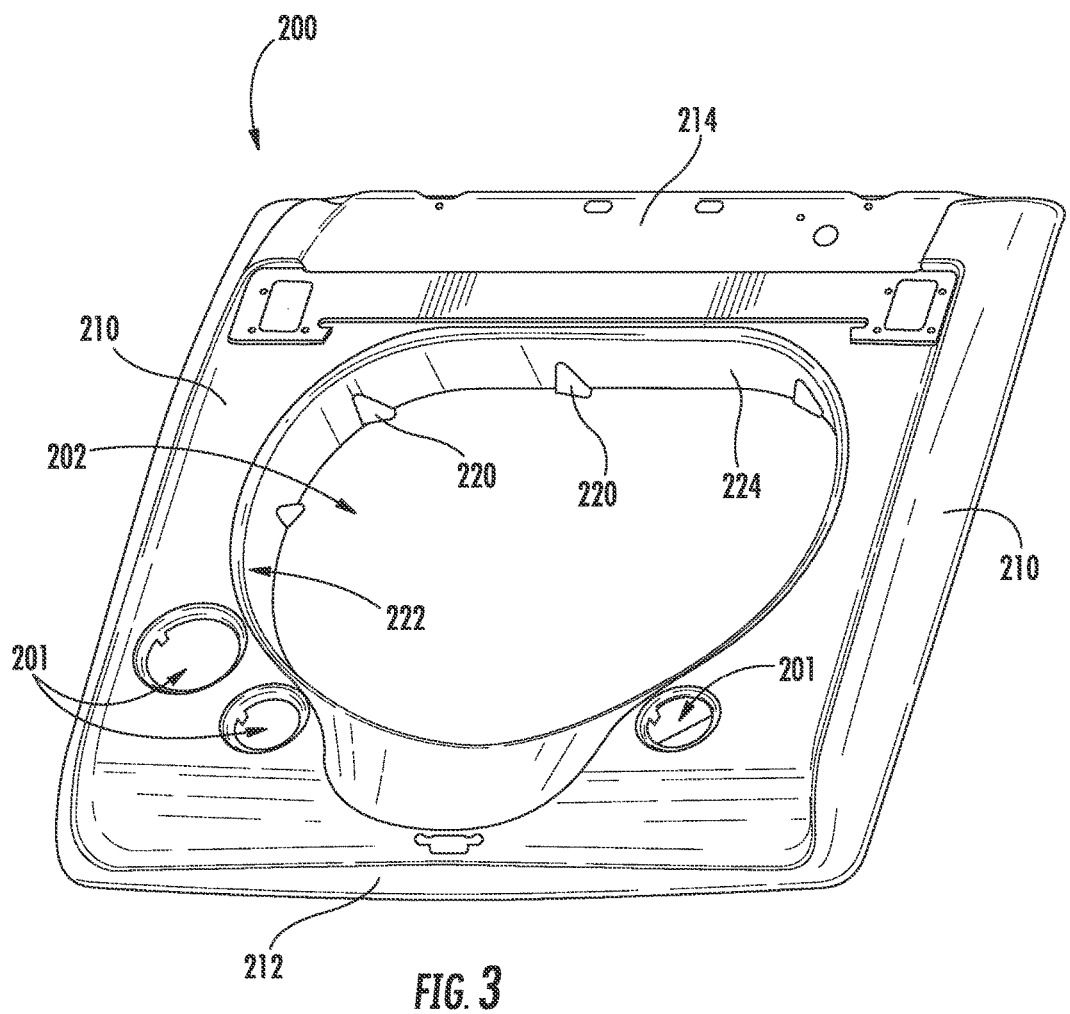
FIG. 3 provides a top, perspective view of a unitary top panel of the exemplary washing machine appliance of FIG. 1.
Figure 3:
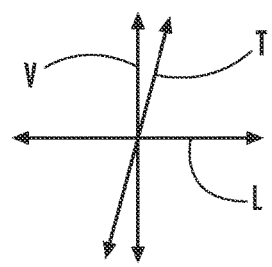
Figure 4:
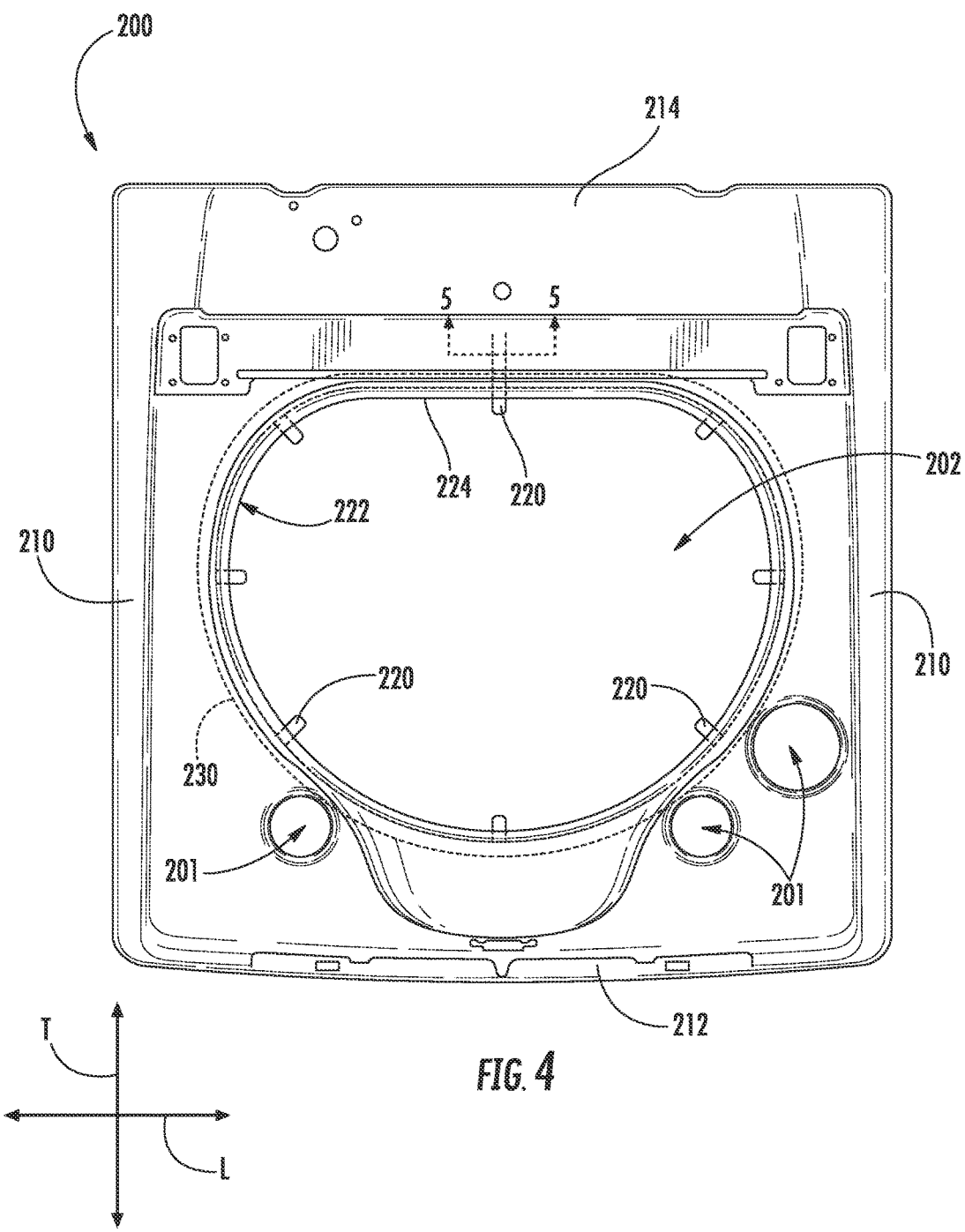
FIG. 4 provides a top, plan view of the unitary top panel of the exemplary washing machine appliance of FIG. 1.

FIG. 3 provides a top, perspective view of top panel 200. FIG. 4 provides a top, plan view of top panel 200. As may be seen in FIGS. 3 and 4, components of top panel 200 are integral or unitary with one another. Thus, top panel 200 is a unitary top panel, e.g., such top panel 200 is constructed of or with a single continuous piece of material, such as a plastic or metal, as discussed in greater detail below.

Top panel 200 includes a pair of side rails or frame members 210, a front rail or frame member 212 and a back rail or frame member 214. Each one of side frame members 210 is positioned at or adjacent a respective one of first and second side portions 105, 106 of cabinet 102 (FIG. 2). Thus, side frame members 210 are spaced apart from each other along the lateral direction L and positioned at opposite sides of top panel 200 along the lateral direction L. Front frame member 212 is positioned at or adjacent front portion 107 of cabinet 102, and back frame member 214 is positioned at or adjacent back portion 108 of cabinet 102. Thus, front frame member 212 and back frame member 214 are spaced apart from each other along the transverse direction T and positioned at opposite sides of top panel 200 along the transverse direction T. Side frame members 210, front frame member 212 and back frame member 214 assist with defining opening 202, e.g., at a center of top panel 200. Side frame members 210, front frame member 212 and back frame member 214 are integrally formed with one another, e.g., such that side frame members 210, front frame member 212 and back frame member 214 are constructed of or with a single continuous piece of material, such as a plastic or metal.

Top panel 200 also includes a plurality of nozzles 220. Nozzles 220 are positioned at or adjacent opening 202 of top panel 200. Nozzles 220 are also positioned and/or oriented for directing flows of wash fluid into at least one of the wash tub and wash basket 120 of washing machine appliance 100 (FIG. 2). For example, each nozzle of nozzles 220 may direct a flow of wash fluid into wash basket 120 and onto articles within wash basket 120. Thus, top panel 200 and nozzles 220 may be positioned above wash basket 120 along the vertical direction V in order to direct wash fluid downwardly along the vertical direction V into wash basket 120. Perimeter 222 of opening 202 may be defined by a sidewall 224 of top panel 200 that extends about opening 202. Thus, nozzles 220 may be positioned on sidewall 224 of top panel 200 at opening 202.

As discussed above, nozzles 220 are positioned at or adjacent opening 202 of top panel 200. Nozzles 220 may be, e.g., uniformly, distributed about or along a perimeter 222 of opening 202. Thus, with nozzles 220 spread around opening 202, the distribution of nozzles 220 and spray from nozzles 220 may be complementary to a shape of basket 120, e.g., a sidewall of basket 120, such that the spray is uniformly and/or evenly applied to articles within basket 120. In such a manner, application of wash fluid onto articles within wash basket 120 with nozzles 220 may be uniform and/or even. For example, articles within wash basket 120 may be sprayed with wash fluid from at least one nozzle of nozzles 220 regardless of the location of the articles within wash basket 120. In addition, after a spin cycle, articles within basket 120 may be stuck on the sidewall of basket 120. The spray pattern of wash fluid from nozzles 220 may assist with rinsing articles within basket 120 when the articles within basket 120 are stuck on the sidewall of basket 120. Thus, the spray pattern of wash fluid from nozzles 220 may assist with "spray rinsing" articles within basket 120, e.g., as described in U.S. Pat. No. 5,737,790 of Badger et al., which is hereby incorporated by reference for all purposes, in order to conserve water. The spray pattern of nozzles 220 may also assist with disengaging or removing the articles from the sidewall of basket 120.

Nozzles 220 may include any suitable number of nozzles. For example, nozzles 220 may include at least two nozzles, at least three nozzles, at least four nozzles, at least six nozzles, at least eight nozzles or more nozzles. However, it should be understood that, in certain exemplary embodiments, top panel 200 may include only a single nozzle rather than multiple nozzles. Nozzles 220 are integrally formed on top panel 200, e.g., such that side frame members 210, front frame member 212, back frame member 214 and nozzles 220 are constructed of or with a single continuous piece of material, such as a plastic or metal.

As may be seen in FIG. 4, top panel 200 also defines a conduit 230 within top panel 200. Conduit 230 extends to each nozzle of nozzles 220 in order to direct wash fluid to nozzles 220, e.g., during operation of washing machine appliance 100. Conduit 230 may be defined by the material of top panel 200, e.g., such that conduit 230 and fluid within conduit 230 is completely disposed within top panel 200. By forming conduit 230 within top panel 200 and with the material of top panel 200, fluid leaks from conduit 230 may be less likely or reduced. For example, wash basket 120 may strike top panel 200 is wash basket 120 is out of balance during rotation of wash basket 120. If conduit 230 were a hose or pipe mounted to a bottom portion of top panel 120, wash basket 120 could sever or impinge the hose or pipe and negatively affect operation of nozzles 220. Thus, performance of nozzles 220 may be improved by defining conduit 230 within top panel 200.

Figure 5:
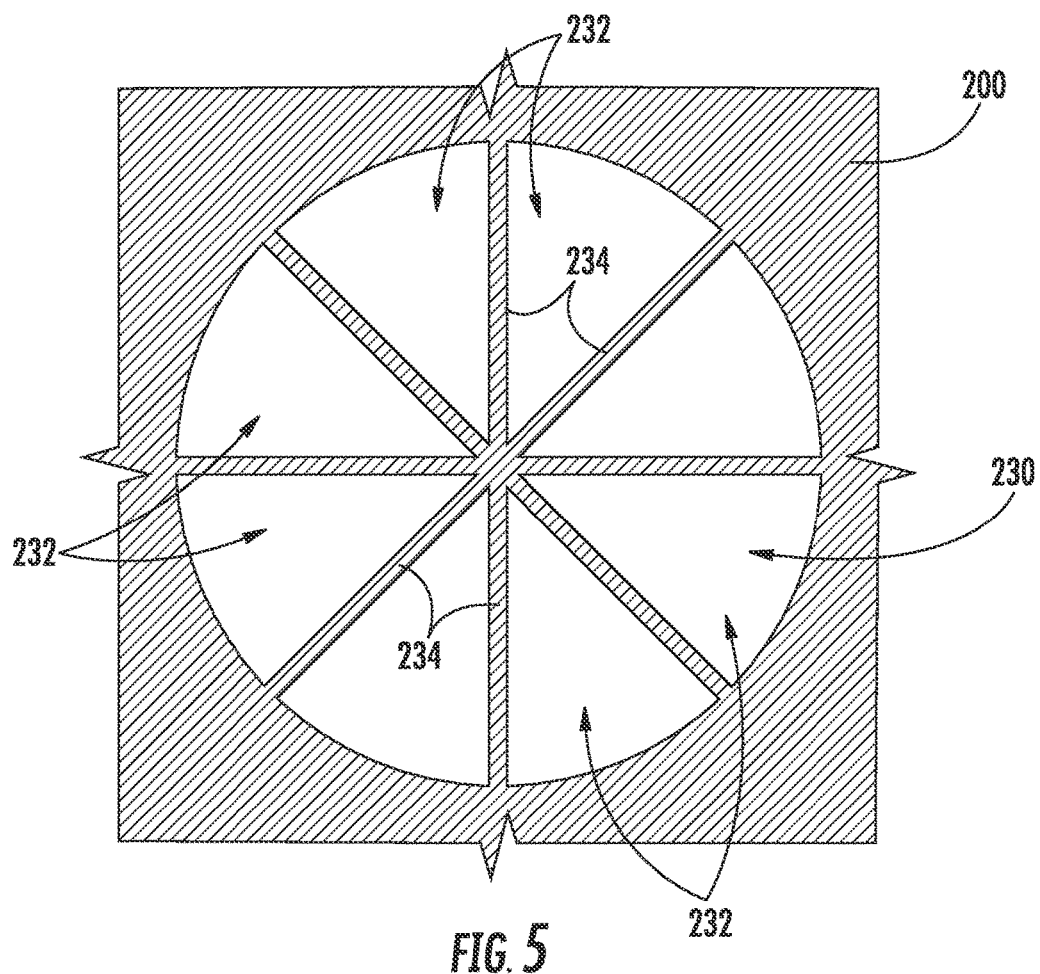
FIG. 5 provides a partial, section view of the unitary top panel of FIG. 4 taken along the 5-5 line of FIG. 4.

FIG. 5 provides a partial, section view of top panel 200 taken along the 5-5 line of FIG. 4. As may be seen in FIG. 5, conduit 230 defines a plurality of channels 232. Channels 232 are discrete and separated from each other by walls 234 of conduit 230. Each channel of channels 232 extends to a respective nozzle of nozzles 220 within top panel 220. Thus, wash fluid may flow through a respective one of channels 232 to each one of nozzles 220. Each channel of channels 232 may have a common cross-sectional area, as shown in FIG. 5. Thus, a flow rate of wash fluid to each nozzle of nozzles 220 via conduit 230 may be substantially uniform or equal. In alternative exemplary embodiments, conduit 230 need not include walls 234 that divides conduit 230 into channels 232. In such exemplary embodiments, the cross-sectional area of conduit 230 may contract along a length of conduit 230 in order to maintain or provide a uniform or common flow rate of wash fluid to each nozzle of nozzles 220, as will be understood by those skilled in the art.

Figure 6:
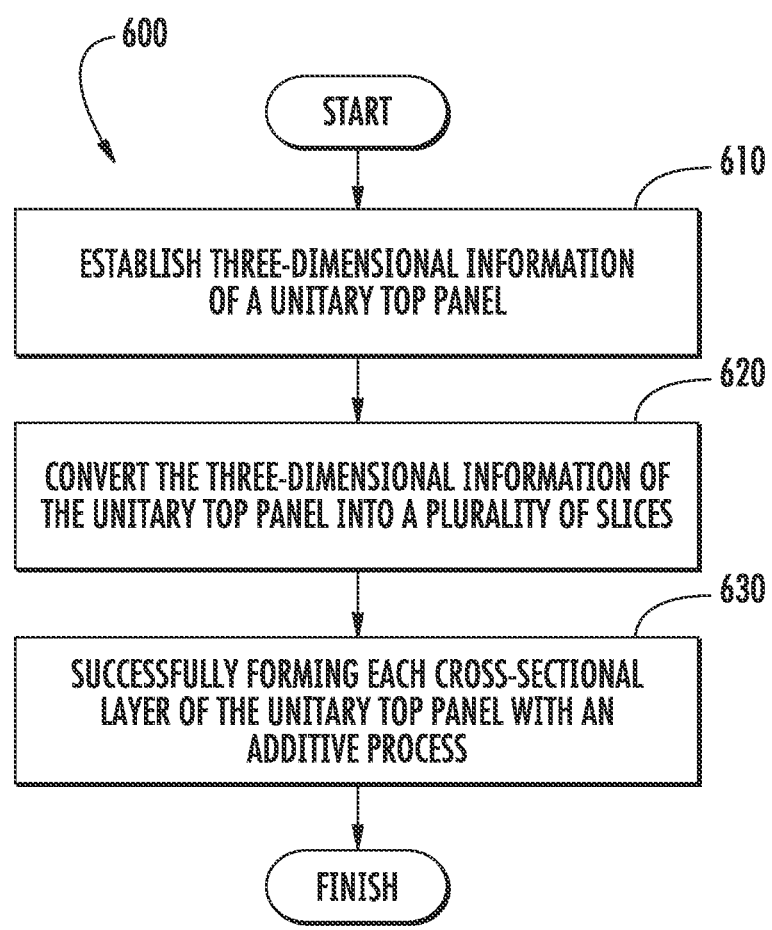
FIG. 6 illustrates a method for forming a unitary top panel according to an exemplary embodiment of the present subject matter.

FIG. 6 illustrates a method 600 for forming a unitary top panel according to an exemplary embodiment of the present subject matter. Method 600 may be used to form any suitable nozzle. For example, method 600 may be used to form top panel 200 (FIG. 3). Method 600 permits formation of various features of top panel 200, as discussed in greater detail below. Method 600 includes fabricating top panel 200 as a unitary nozzle, e.g., such that top panel 200 is formed of a single continuous piece of plastic, metal or other suitable material. More particularly, method 600 includes manufacturing or forming top panel 200 using an additive process, such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering and other known processes. An additive process fabricates plastic or metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished.

Accordingly, at step 610, three-dimensional information of top panel 200 is determined. As an example, a model or prototype of top panel 200 may be scanned to determine the three-dimensional information of top panel 200 at step 610. As another example, a model of top panel 200 may be constructed using a suitable CAD program to determine the three-dimensional information of top panel 200 at step 610. At step 620, the three-dimensional information is converted into a plurality of slices that each defines a cross-sectional layer of top panel 200. As an example, the three-dimensional information from step 610 may be divided into equal sections or segments, e.g., along a central axis of opening 202 or any other suitable axis. Thus, the three-dimensional information from step 610 may be discretized at step 620, e.g., in order to provide planar cross-sectional layers of top panel 200.

After step 620, top panel 200 is fabricated using the additive process, or more specifically each layer is successively formed at step 630, e.g., by fusing or polymerizing a plastic using laser energy or heat. The layers may have any suitable size. For example, each layer may have a size between about five ten-thousandths of an inch and about one thousandths of an inch. Top panel 200 may be fabricated using any suitable additive manufacturing machine as step 630. For example, any suitable laser sintering machine, inkjet printer or laserjet printer may be used at step 630.

Utilizing method 600, top panel 200 may have fewer components and/or joints than known nozzles. Specifically, top panel 200 may require fewer components because top panel 200 may be a single piece of continuous plastic or metal, e.g., rather than multiple pieces of plastic or metal joined or connected together. Also, nozzles 220 and conduit 230 may be integrated into top panel 200 and walls 234 of conduit 230 may be formed within conduit 230 using method 600. As a result, top panel 200 may provide improved wash fluid flow into wash basket 120, e.g., by dispersing or spray wash fluid in a desired pattern. Also, top panel 200 may be less prone to leaks and/or be stronger when formed with method 600.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A vertical axis washing machine appliance, comprising:
    a tub;
    a basket positioned within the tub, the basket rotatable about a vertical axis within the tub;
    a cabinet extending between a top portion and a bottom portion, the tub disposed within the cabinet, the cabinet having a unitary top panel positioned at the top portion of the cabinet, the unitary top panel defining an opening for accessing the basket within the tub, the unitary top panel having a nozzle positioned at the opening of the unitary top panel and oriented for directing a flow of wash fluid into at least one of the basket and the tub, the unitary top panel defining a conduit within the unitary top panel that extends to the nozzle in order to direct the flow of wash fluid to the nozzle,
    wherein the unitary top panel is integrally formed with a single piece of continuous plastic.

2. The vertical axis washing machine appliance of claim 1, wherein the unitary top panel has a plurality of nozzles positioned at the opening of the unitary top panel, the nozzles of the plurality of nozzles distributed about a perimeter of the opening of the unitary top panel.

3. The vertical axis washing machine appliance of claim 2, wherein the conduit extends to each nozzle of the plurality of nozzles within the unitary top panel.

4. The vertical axis washing machine appliance of claim 3, wherein a cross-sectional area of the conduit contracts along a length of the conduit.

5. The vertical axis washing machine appliance of claim 3, wherein the conduit defines a plurality of channels, each channel of the plurality of channels extending to a respective nozzle of the plurality of nozzles within the unitary top panel.

6. The vertical axis washing machine appliance of claim 5, wherein each channel of the plurality of channels has a common cross-sectional area.

7. The vertical axis washing machine appliance of claim 2, wherein the cabinet extends between a front portion and a back portion and a first side portion and a second side portion, the unitary top panel having a pair of side frame members, a front frame member and a back frame member, each side frame member of the pair of side frame members positioned at a respective one of the first and second side portions of the cabinet, the front frame member positioned at the front portion of the cabinet, the back frame member positioned at the back portion of the cabinet.

8. The vertical axis washing machine appliance of claim 7, wherein the side frame members of the pair of side frame members, the front frame member, the back frame member and the nozzles of the plurality of nozzles integrally formed with a single piece of continuous plastic.

9. The vertical axis washing machine appliance of claim 2, wherein the plurality of nozzles comprises at least six nozzles.

10. A method for forming a unitary top panel for a washing machine appliance, comprising:
    establishing three-dimensional information of the unitary top panel;
    converting the three-dimensional information of the unitary top panel from said step of establishing into a plurality of slices, each slice of the plurality of slices defining a respective cross-sectional layer of the unitary top panel; and
    successively forming each cross-sectional layer of the unitary top panel with an additive process;
    wherein, after said step of successively forming: (1) the unitary top panel defines an opening at a middle portion of the unitary top panel; (2) the unitary top panel has a nozzle positioned at the opening of the unitary top panel; (3) the unitary top panel defines a conduit within the unitary top panel that extends to the nozzle; and (4) the unitary top panel is a single continuous piece of plastic.

11. The method of claim 10, wherein the additive process comprises at least one of fused deposition modeling, selective laser sintering, stereolithography, and digital light processing.

12. The method of claim 10, wherein the unitary top panel has a plurality of nozzles positioned at the opening with the nozzles of the plurality of nozzles distributed about a perimeter of the opening after said step of successively forming.

13. The method of claim 12, wherein the conduit extends to each nozzle of the plurality of nozzles within the unitary top panel after said step of successively forming.

14. The method of claim 13, wherein the conduit defines a plurality of channels with each channel of the plurality of channels extending to a respective nozzle of the plurality of nozzles within the unitary top panel after said step of successively forming.

15. The method of claim 14, each channel of the plurality of channels has a common cross-sectional area.

16. The method of claim 12, Wherein the unitary top panel has a pair of side frame members, a front frame member and a back frame member, the side frame members of the pair of side frame members, the front frame member, the back frame member and the nozzles of the plurality of nozzles integrally formed with a single piece of continuous plastic after said step of successively forming.

17. The method of claim 12, wherein the plurality of nozzles comprises at least six nozzles.

18. A vertical axis washing machine appliance, comprising:
    a tub;
    a basket positioned within the tub, the basket rotatable about a vertical axis within the tub;
    a cabinet extending between a top portion and a bottom portion, the tub disposed within the cabinet, the cabinet having a unitary top panel positioned at the top portion of the cabinet, the unitary top panel defining an opening for accessing the basket within the tub, the unitary top panel having a nozzle positioned at the opening of the unitary top panel and oriented for directing a flow of wash fluid into at least one of the basket and the tub, the unitary top panel defining a conduit within the unitary top panel that extends to the nozzle in order to direct the flow of wash fluid to the nozzle, wherein the unitary top panel has a plurality of nozzles positioned at the opening of the unitary top panel, the nozzles of the plurality of nozzles distributed about a perimeter of the opening of the unitary top panel, wherein the cabinet extends between a front portion and a back portion and a first side portion and a second side portion, the unitary top panel having a pair of side frame members, a front frame member and a back frame member, each side frame member of the pair of side frame members positioned at a respective one of the first and second side portions of the cabinet, the front frame member positioned at the front portion of the cabinet, the back frame member positioned at the back portion of the cabinet, and wherein the side frame members of the pair of side frame members, the front frame member, the back frame member and the nozzles of the plurality of nozzles are integrally formed with a single piece of continuous plastic.

\* \* \* \* \*